United States Patent

Kazui et al.

[11] Patent Number: 5,920,650
[45] Date of Patent: Jul. 6, 1999

[54] MOTION PICTURE RECONSTRUCTING METHOD AND APPARATUS

[75] Inventors: Kimihiko Kazui; Eishi Morimatsu, both of Kawasaki, Japan

[73] Assignee: Fujitsu Limited, Kawasaki, Japan

[21] Appl. No.: 08/658,558

[22] Filed: Jun. 5, 1996

[30] Foreign Application Priority Data

Oct. 27, 1995 [JP] Japan .................................. 7-280026

[51] Int. Cl.$^6$ .............................. G06K 9/36; G06K 9/46
[52] U.S. Cl. ........................................ 382/233; 382/236
[58] Field of Search .................................... 382/107, 236, 382/286, 291; 348/155, 413, 416, 699; 352/233

[56] References Cited

U.S. PATENT DOCUMENTS 5,614,958  3/1997  Shikakura ............................... 348/616

FOREIGN PATENT DOCUMENTS 0 633 546  1/1995  European Pat. Off. .

*Primary Examiner*—Phuoc Tran
*Attorney, Agent, or Firm*—Staas & Halsey

[57] ABSTRACT

A motion picture reconstructing method includes steps of inputting motion picture data of a plurality of frames, the frames including a processed frame and a reference frame, inputting motion vectors of picture elements of each frame, region data of objects in a motion picture of each frame, and object identification data, the object identification data indicating an object among the objects which is to be removed, determining estimated values of picture elements of the processed frame by using estimated motion vectors of picture elements of the reference frame, the picture elements of the processed frame being within a region of the object, substituting the estimated values for values of the picture elements of the processed frame, and outputting the picture elements having the estimated values. Thus, providing a reconstructed motion picture of the processed frame in which the object is removed to view the concealed picture beneath the object.

15 Claims, 8 Drawing Sheets

5,920,650

MOTION PICTURE RECONSTRUCTING METHOD AND APPARATUS

BACKGROUND OF THE INVENTION (1) Field of the Invention

The present invention relates to a motion picture reconstructing method and apparatus which provide a function for manipulation of digital visual data for an operator to manipulate an object or objects in a motion picture.

With rapid development of moving picture processing technology, functions of object manipulation and others of digital audio-visual data have been demanded, and these functions are to be supported by MPEG-4 (Moving Picture Experts Group Phase 4). The object manipulation will offer several capabilities to an operator, including the functions of object translation, object color change, object shape change, object replacement, and object deletion with respect to one of the independent objects of a motion picture.

MPEG-4 is an emerging coding standard that supports new ways for communication, access, and manipulation of digital audio-visual data. The object manipulation mentioned above is one of various functions to be supported by MPEG-4.

(2) Description of the Related Art

FIGS. 1A, 1B and 1C show the basic concept of reconstructing a motion picture in which an overlay is removed or deleted to view the concealed video beneath the overlay.

An original picture is shown in FIG. 1A. In the original picture, background objects including a shaded vehicle 2 and a shaded house 3 are overlaid by a white vehicle 1. Such an object as the vehicle 1 in the original picture will be called the overlay.

An intermediate picture in which the overlay is removed is shown in FIG. 1B. In the intermediate picture, the vehicle 1 is removed, and corresponding areas are left in white.

A final picture which is reconstructed from the original picture to view the video beneath the overlay is shown in FIG. 1C. In the final picture, the corresponding areas of the vehicle 2 and the house 3, concealed by the vehicle 1 in the original picture, are generated.

In order to carry out the reconstruction of the motion picture, it is necessary to estimate values of the concealed picture elements of the background objects when the graphics overlay is removed. The estimated picture elements are used for substitution for the corresponding picture elements of the final picture, so that the overlay is removed and the picture beneath the overlay looks natural in the reconstructed picture.

In a case of a motion picture in which the background objects are fixed or not moving, a conventional method which estimates values of the concealed picture elements within the motion picture of the present frame is known. In the conventional method, corresponding picture elements of the background objects of the frames preceding or following the present frame are searched, and the values of the concealed picture elements of the present frame are estimated from values of the picture elements of the background objects found in the preceding or following frames.

However, in a case of a motion picture in which the background objects are moving, it is impossible for the above conventional method to estimate the values of the concealed picture elements of the present frame from the values of the corresponding picture elements of the background objects of the preceding or following frames. In this case, the positions of the background objects in the motion picture are changed from frame to frame. The conventional method does not teach estimating or tracking the positions of the picture elements of the background objects of the preceding and following frames.

Further, in order to carry out the conventional method, it is necessary to store the data of the picture elements of the background objects of all the preceding and following frames including the present frame into a frame memory. Therefore, the conventional method requires the frame memory to have a large amount of storage capacity. In addition, the above conventional method is not suited to perform a real-time data processing for the reconstruction of a motion picture when the overlay is removed.

SUMMARY OF THE INVENTION

An object of the present invention is to provide a novel and useful motion picture reconstructing method and apparatus in which the above-described problems are eliminated.

Another object of the present invention is to provide a motion picture reconstructing method which provides the capabilities to remove an overlay from a motion picture and to view the picture beneath the overlay.

Still another object of the present invention is to provide a motion picture reconstructing apparatus which efficiently removes an overlay from a motion picture and views the picture beneath the overlay with a natural appearance.

The above-mentioned objects of the present invention are achieved by a motion picture reconstructing method which includes the steps of: inputting motion picture data of a plurality of frames including a processed frame and a reference frame; inputting motion vectors of picture elements of each frame, region data of objects in each frame, and object identification data, the object identification data indicating an object among the objects to be removed; determining estimated values of picture elements of the processed frame by using estimated motion vectors of picture elements of the reference frame, the picture elements of the processed frame being within a region of the object and concealed by the object; substituting the estimated values for values of the concealed picture elements of the processed frame; and outputting the picture elements having the estimated values, which constitute a reconstructed motion picture in which the object is removed.

The above-mentioned objects of the present invention are achieved by a motion picture reconstructing apparatus which includes: a first estimating unit inputting motion vectors of picture elements of a plurality of frames, region data of objects in each frame, and object identification data, the frames including a processed frame and a reference frame, the object identification data indicating an object among the objects to be removed; and a second estimating unit, coupled to the first estimating unit, inputting motion picture data of each frame, the region data of each frame and the object identification data. In the motion picture reconstructing apparatus, the first estimating unit determines estimated motion vectors of picture elements of the processed frame by motion vectors of corresponding picture elements of the reference frame, in accordance with the input motion vectors of the reference frame, the picture elements of the processed frame being within a region of the object and concealed by the object. The second estimating unit determines estimated values of picture elements of the processed frame by using the estimated motion vectors from the first estimating unit. The second estimating unit substitutes the estimated values for values of the concealed picture elements of the processed frame, and outputs the picture elements having the estimated values, which constitute a reconstructed motion picture in which the object is removed.

According to the present invention, it is possible to determine estimated values of the concealed picture elements which make the processed motion picture look natural when the overlay is removed. It is possible to remarkably reduce the storage capacity of the frame memory needed by the motion picture reconstructing method of the present invention. Further, in the motion picture reconstructing apparatus of the present invention, it is possible to efficiently perform the digital data processing needed to remove the overlay from the motion picture and view the picture beneath the overlay with a natural appearance, and the delay of the inputting and outputting of the digital data is reduced.

BRIEF DESCRIPTION OF THE DRAWINGS

The above and other objects, features and advantages of the present invention will become more apparent from the following detailed description when read in conjunction with the accompanying drawings in which.

DETAILED DESCRIPTION OF THE PREFERRED EMBODIMENTS

A description will now be given of the preferred embodiments of the present invention with reference to the accompanying drawings.

Figure 1:
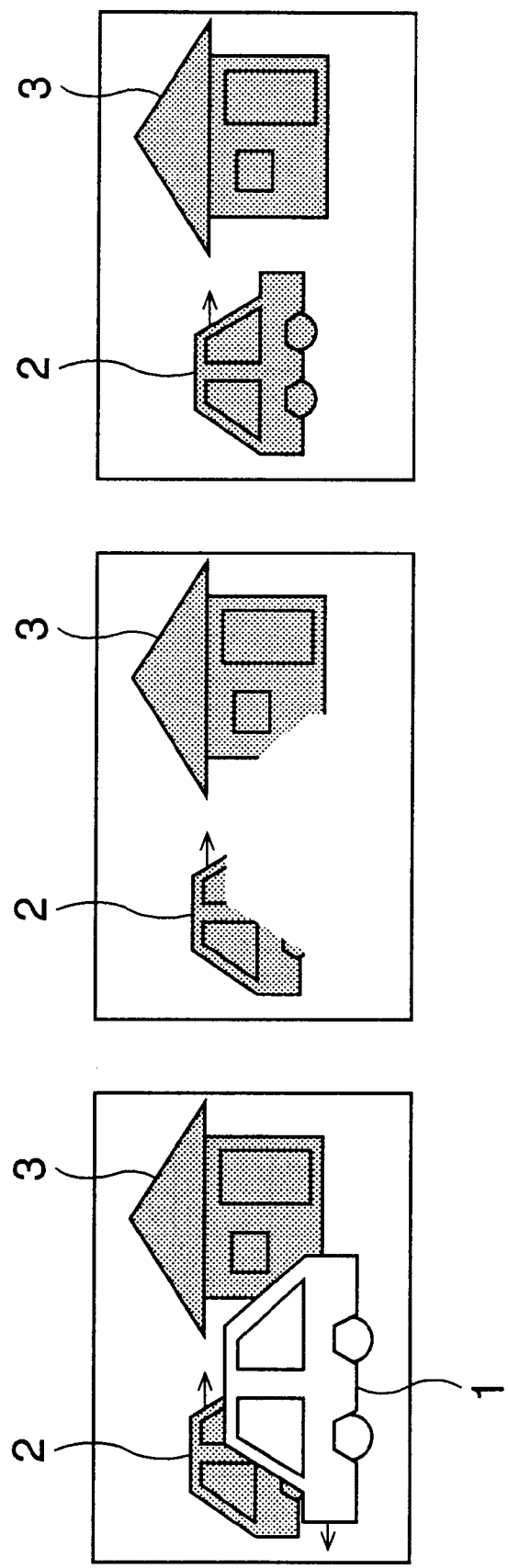
FIGS. 1A, 1B and 1C are diagrams for explaining the basic concept of reconstructing a motion picture in which an overlay is removed.
Figure 2:
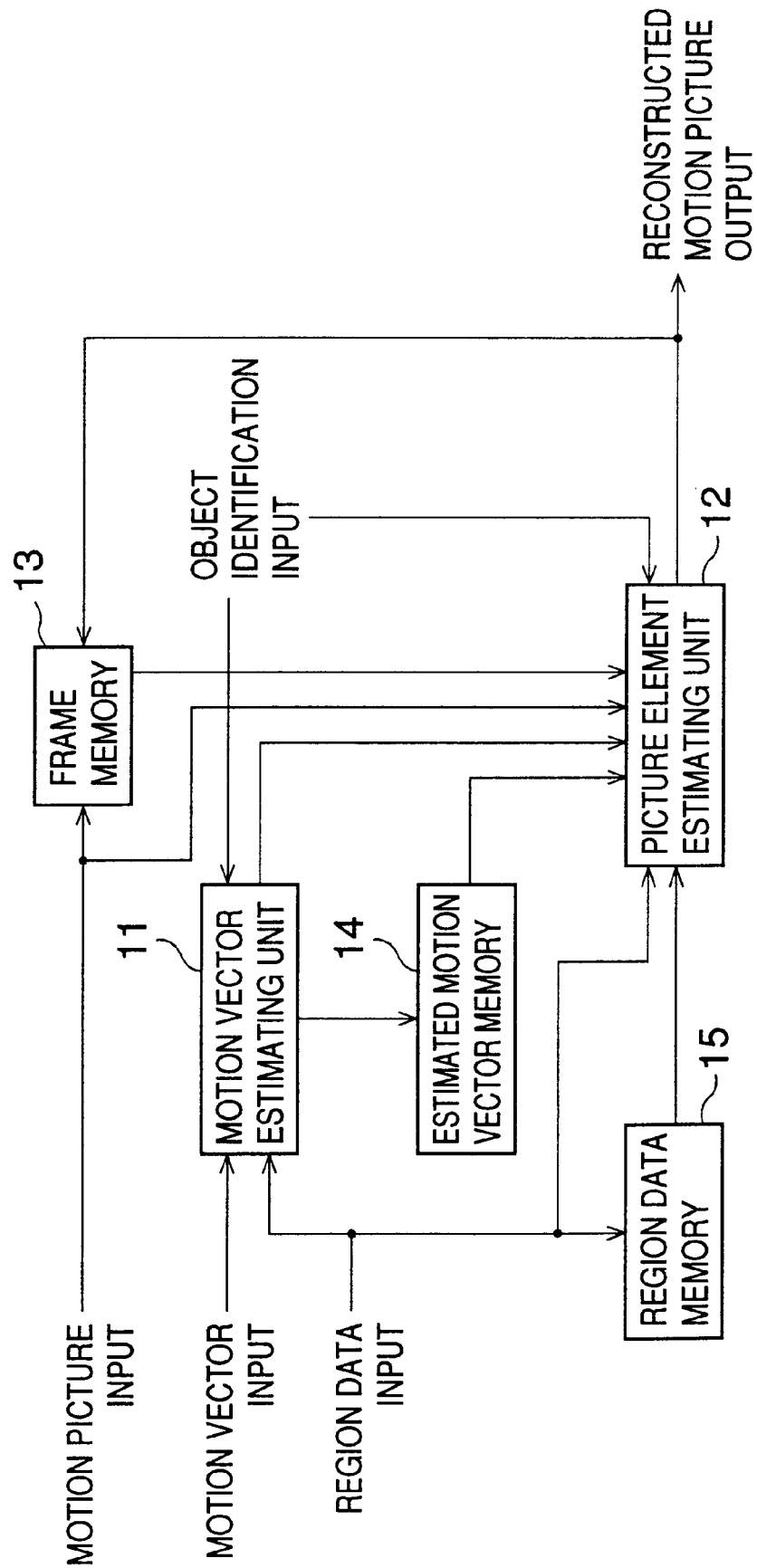
FIG. 2 is a block diagram of a motion picture reconstructing apparatus in one embodiment of the present invention.

FIG. 2 shows a motion picture reconstructing apparatus in one embodiment of the present invention. The motion picture reconstructing apparatus performs the reconstruction of a motion picture in which a graphics overlay is removed to view video beneath the graphics overlay.

Referring to FIG. 2, the motion picture reconstructing apparatus inputs motion picture data of a plurality of frames, motion vectors of picture elements of each frame, region data of objects in the motion picture of each frame, and object identification data. The object identification data indicates an overlay object among the objects which is to be removed from the motion picture.

The motion picture reconstructing apparatus comprises a motion vector estimating unit 11, a picture element estimating unit 12, a frame memory 13, an estimated motion vector memory 14, and a region data memory 15.

The motion picture reconstructing apparatus outputs the picture elements in the non-concealed region of the frame and the estimated picture elements in the concealed region of the frame, which constitute a reconstructed motion picture in which the overlay object is removed to view the concealed picture beneath the overlay object.

Figure 3A:
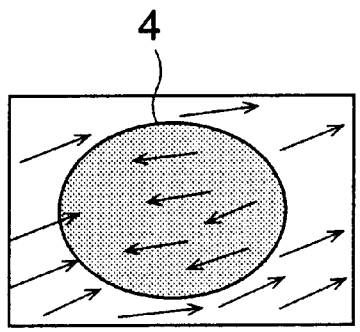
FIGS. 3A, 3B and 3C are diagrams for explaining the basic concept of estimating motion vectors of the concealed picture elements according to the present invention.
Figure 3B:
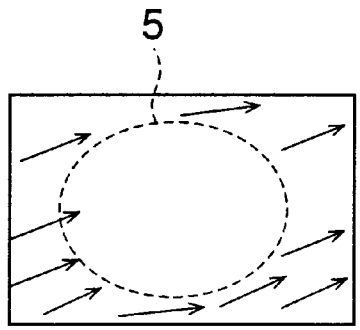
Figure 3C:
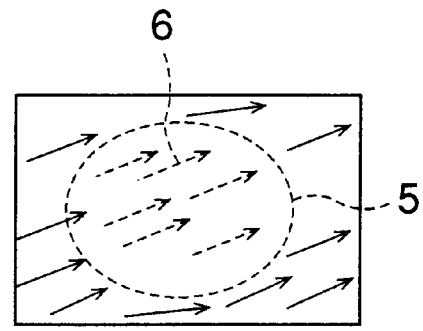

FIGS. 3A, 3B and 3C show the basic concept of estimating motion vectors of concealed picture elements according to the present invention.

In FIG. 3A, an original picture is shown. As shown, motion vectors of the original picture including a background region and an overlay object 4 (in the shaded area) are indicated by right-direction arrows and left-direction arrows. The overlay object 4 is removed from the original picture, and estimated motion vectors of the concealed area are generated.

In FIG. 3B, an intermediate picture is shown. In the intermediate picture, the overlay object 4 is removed from the original picture, and an area of the background region corresponding to the overlay object 4 is indicated by a dotted line 5 in FIG. 3B. The motion vectors of the picture elements of the background region are indicated by the right-direction arrows, and the motion vectors of the picture elements of the overlay object 4 indicated by the left-direction arrows are removed.

The motion picture reconstructing apparatus of the present invention outputs estimated motion vectors of the concealed picture elements within the area 5 of the background region. In FIG. 3C, the estimated motion vectors of the concealed picture elements are indicated by dotted-line arrows 6 in FIG. 3C. The dotted-line arrows 6 for the estimated motion vectors are similar to the right-direction arrows for the motion vectors of the non-concealed picture elements in the background region. The estimated motion vectors, as indicated in FIG. 3C, are used by the motion picture reconstructing apparatus of the present invention to determine estimated values of the concealed picture elements, which will be described later.

The motion vector estimating unit 11, shown in FIG. 2, inputs the motion vector data, the region data and the object identification data, and determines a region of the overlay object (which is to be removed from the motion picture) in accordance with the object identification data and the region data. By using the motion vector data, the motion vector estimating unit 11 determines and outputs estimated motion vectors of all picture elements included in the region of the overlay object. The picture elements of the region of the overlay object are the concealed picture elements which are not viewed in the original picture due to the overlay object.

Generally, it is impossible to reconstruct the original motion vectors of the concealed picture elements before the overlay is removed. However, under the condition that the motion vectors of the concealed picture elements when the overlay is removed are considered uniform, one can suppose that the motion vectors of the concealed picture elements are essentially the same as the motion vectors of the non-concealed picture elements in the background region.

Further, in a case in which the motion vectors of all the concealed picture elements within the entire region of the overlay object are considered non-uniform, it can be supposed that the motion vectors of the concealed picture elements within a certain local region of the overlay object are locally uniform. Accordingly, a motion vector of a reference picture element among the non-concealed picture elements in the background region (the reference picture element is located at the nearest to a processed picture element) can be determined as the estimated motion vector of the processed picture element. The processed picture element is one of the concealed picture elements within the region of the overlay object.

The motion vector estimating unit 11, shown in FIG. 2, comprises an estimating circuit which is capable of determining a motion vector of the reference picture element among the non-concealed picture elements as the estimated motion vector of the processed picture element among the concealed picture elements.

The frame memory 13 stores the motion picture data of a reference frame which is different from the processed frame. The reference frame is either a preceding processed frame or a following processed frame. The estimated motion vector memory 14 stores the estimated motion vectors of the concealed picture elements of the reference frame. The estimated motion vectors are output by the above motion vector estimating unit 11 and stored in the estimated motion vector memory 14. The region data memory 15 stores the region data of objects of the motion picture of the reference frame.

The picture element estimating unit 12, shown in FIG. 2, inputs the object identification data, the motion picture data of the processed frame, the estimated motion vectors of the concealed picture elements of the processed frame, the region data of the processed frame, the stored motion picture data of the reference frame from the frame memory 13, the stored estimated motion vectors of the reference frame from the estimated motion vector memory 14, and the stored region data of the reference frame from the region data memory 15.

In accordance with the above-mentioned input data, the picture element estimating unit 12 determines estimated values of the concealed picture elements of the processed frame by using estimated motion vectors of the corresponding picture elements of the reference frame.

More specifically, the picture element estimating unit 12 generates a position of a corresponding picture element P' of the reference frame through movement of a concealed picture element P of the processed frame using a displacement indicated by an estimated motion vector of the concealed picture element P. When the generated position of the corresponding picture element of the reference frame as a result of the repetition of the movement is detected to be outside the region of the overlay of the reference frame, the picture element estimating unit 12 determines an estimated value of the picture element of the processed frame by a value of the corresponding picture element of the reference frame at the generated position. The reference frame is either a following processed frame or a preceding processed frame with respect to the processed frame.

When it is detected that the generated position of the corresponding picture element is within the region of the overlay, the movement of the concealed picture element to a new position of a corresponding picture element of a new reference frame is repeated. The repetition of the movement is performed until the generated position is detected to be outside the region of the overlay.

Further, the picture element estimating unit 12 substitutes the estimated values for the values of the concealed picture elements of the processed frame.

In order for the picture element estimating unit 12 of the present embodiment to determine the estimated picture element values, it is necessary that the motion picture data of the reference frame, the estimated motion vectors of the corresponding picture elements of the reference frame, and the region data of objects of the reference frame are stored in the frame memory 13, the estimated motion vector memory 14, and the region data memory 15, respectively.

In the motion picture reconstructing apparatus of the present embodiment, the processed data including the picture elements with the estimated values, output from the picture element estimating unit 12, can be stored in the frame memory 13.

Generally, the time for processing motion picture data of "N" frames is required in order to output a reconstructed motion picture of an N-th following or preceding frame in which the overlay is removed and the picture beneath the overlay is viewed, starting from the original motion picture of the processed frame in which the background objects are concealed by the overlay. Therefore, it is necessary that a motion picture reconstructing apparatus include a frame memory for storing motion picture data of the "N" following or preceding frames including the processed frame.

However, if the motion picture reconstructing apparatus of the present embodiment uses a preceding-frame reference method (which will be described later), it is possible to accomplish the determination of the estimated values of the concealed picture elements of the processed frame with no delay of the inputting and outputting of digital data by storing only the motion picture data of the reference frame in the frame memory 13. Since the position of each of the corresponding picture elements of the reference frame as a result of the repetition of the movement based on the estimated motion vectors is detected to be outside the region of the overlay, the motion picture reconstructing apparatus of the present invention requires inputting only the stored motion picture data of the reference frame from the frame memory 13.

Figure 4:
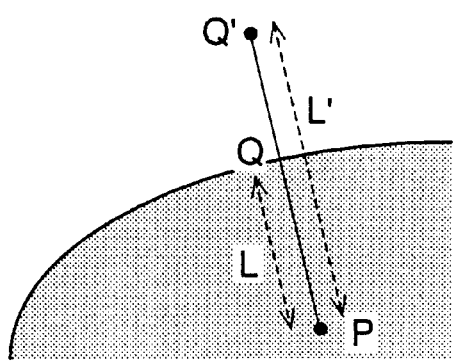
FIG. 4 is a diagram for explaining the basic concept of determining an estimated motion vector of a concealed picture element.

FIG. 4 shows the basic concept of determining an estimated motion vector of a concealed picture element, which is performed in accordance with the present invention.

In FIG. 4, "P" indicates a concealed picture element which is one of the concealed picture elements within the overlay object (in the shaded area) of the motion picture, "Q" indicates a non-concealed picture element at the nearest to the element P on a boundary of the overlay object, and "Q'" indicates another non-concealed picture element on an extended line of the line PQ at a predetermined distance "delta L" from the element Q.

It is supposed that the non-concealed picture element Q has a motion vector V, and the non-concealed picture element Q' has a motion vector V'. According to the present invention, an estimated motion vector VP of the concealed picture element P is determined by a distance-weighted average of the motion vectors V and V' of the non-concealed picture elements Q and Q' in accordance with the following formula, the distance-weighted average determined depending on the distances of the points Q and Q' from the point P.

$$VP = (L*V + L'*V')/(L+L') \quad (1)$$

where L is the distance between the point Q and the point P, and L' is the distance between the point Q' and the point P.

Since the distance "delta L" between the points Q and Q' is predetermined, the distance L' from the point P to the point Q' is indicated by a sum of the distance "L" and the predetermined distance "delta L". An estimated motion vector of any of a number of concealed picture elements can be determined in accordance with the above formula (1) when each concealed picture element P, the distance L from the point P to the boundary point Q nearest to the point P, and the motion vectors V and V' of the elements Q and Q' are given by the motion vector data, the region data and the object identification data.

The motion vector estimating unit 11 of the present invention, shown in FIG. 2, outputs the estimated motion vector of each of the concealed picture elements in accordance with the motion vector data, the region data, and the object identification data.

Figure 8:
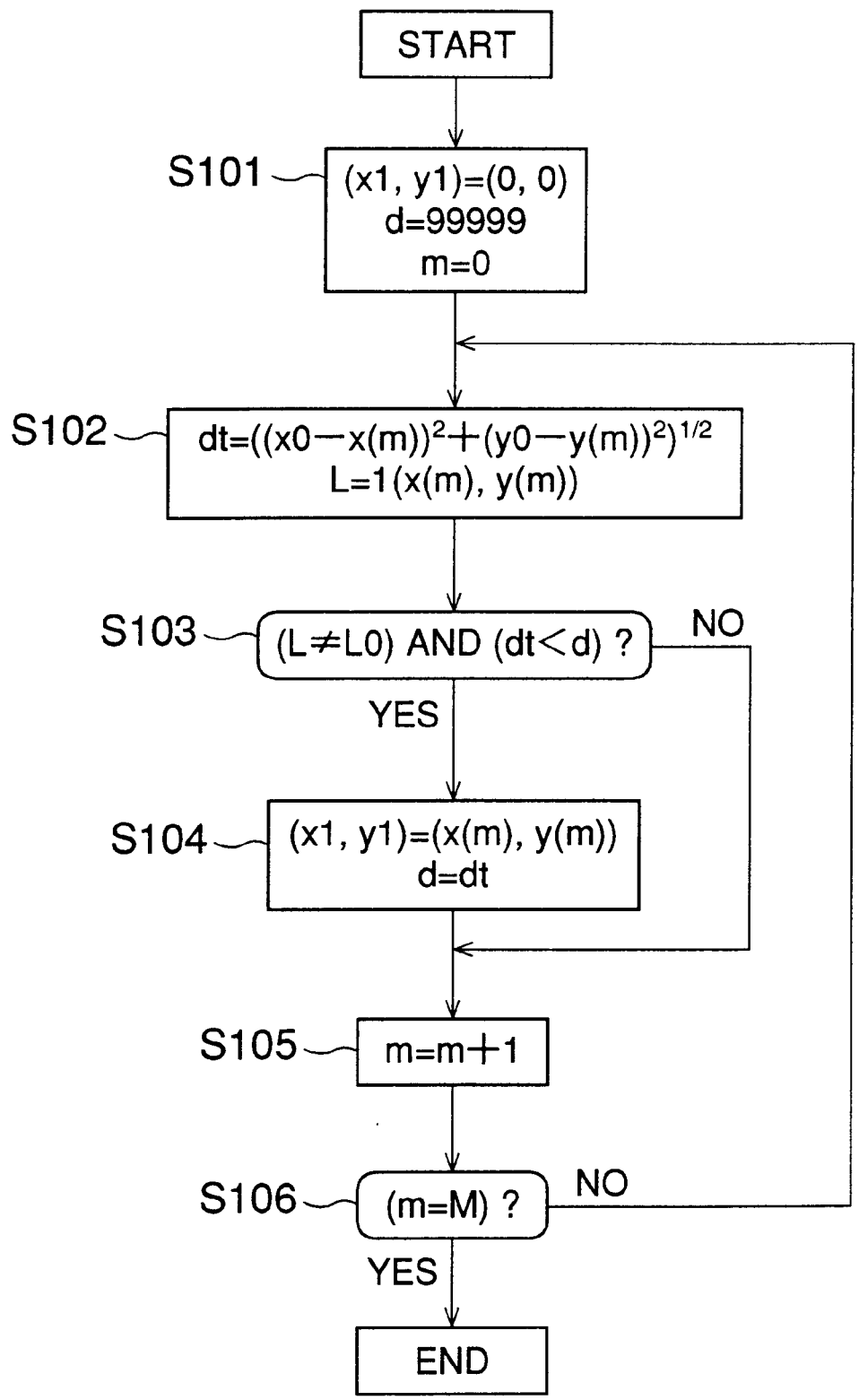
FIG. 8 is a flowchart for explaining a procedure of determining the position of a non-concealed picture element on a boundary of an overlay object nearest to a concealed picture element within the region of the overlay object.

FIG. 8 shows a procedure for determining the position of a non-concealed picture element Q on a boundary of the overlay object nearest to a concealed picture element P within the region of the overlay object. This procedure is used to accomplish the determination of estimated motion vectors of the concealed picture elements, which is performed by the motion vector estimating unit 11 in one embodiment of the present invention.

In the flowchart shown in FIG. 8:

(x0, y0) indicates coordinates of the concealed picture element P of the processed frame;

(xl, yl) indicates coordinates of the non-concealed picture element Q to be found;

(x(m), y(m)) indicates coordinates of a processed picture element with the ID number "m";

"d" indicates a possible smallest distance among distances of the processed picture elements "0" to "m−1" from the concealed picture element P at the position (x0, y0);

"dt" indicates a distance of the processed picture element "m" from the concealed picture element P at the position (x0, y0);

"L" indicates the ID number of a point within the region of an object of the processed frame;

"L0" indicates the ID number of the concealed picture element P at the position (x0, y0);

"l(x, y)" indicates the ID number of a picture element at the position (x, y); and "M" indicates the total number of picture elements included in the processed frame.

Referring to FIG. 8, step S101 initializes the variables which are used in the procedure. At the step S101, the coordinates (xl, yl) of the non-concealed picture element Q are set at (0, 0). The smallest distance d is set at 99999. The initial value of "d" can be sufficiently great at the start of the procedure. The ID number m of a processed picture element is set at zero.

Step S102 calculates the distance dt between the processed picture element m and the concealed picture element P in accordance with the formula: $dt=((x0-x(m))^2+(y0-y(m))^2)y^{1/2}$, and determines the ID number L of an object within which the processed picture element m is included in accordance with the formula: $L=l(x(m), y(m))$.

After the step S102 is performed, step S103 is performed. At the step S103, it is detected whether the ID number L of the object differs from the ID number L0 of the concealed picture element P, and in addition, it is detected whether the distance dt is smaller than the smallest distance d.

If the result at the step S103 is affirmative (the two conditions are satisfied), step S104 is performed. If the result at the step S103 is negative, step S105 is performed and the step S104 is not performed.

At the step S104, the coordinates (x(m), y(m)) of the processed picture element m are substituted for the coordinates (xl, yl) of the non-concealed picture element Q, and the distance dt of the processed picture element m is substituted for the smallest distance d.

At the step S105, the ID number m of the processed picture element is incremented (m=m+1)

After the step S105 is performed, step S106 detects whether the processed picture element m is the final picture element M of the processed frame. If the result at the step S106 is negative (m<M), it is determined that there remains a picture element of the processed frame which is to be further processed. The procedure is returned back to the above step S102.

If the result at the step S106 is affirmative, the procedure of FIG. 8 ends. The coordinates (xl, yl) at this time indicate the position of the non-concealed picture element Q on the boundary of the overlay object, the picture element Q being the nearest to the concealed picture element P within the region of the overlay object.

Referring back to FIG. 4, the position of another non-concealed picture element Q' on the extended line of the line PQ is determined as follows, if the position of the boundary non-concealed picture element Q is determined.

$$Q'=Q+\alpha(Q-P) \qquad (2)$$

where P indicates a position vector of the concealed picture element, Q indicates a position vector of the non-concealed picture element, Q' indicates a position vector of the other non-concealed picture element, and α is a constant value represented by the formula: $\alpha=C/|Q-P|$ where C is a predetermined coefficient.

Next, a description will be given of the determination of estimated values of the concealed picture elements according to the present invention.

Figure 5:
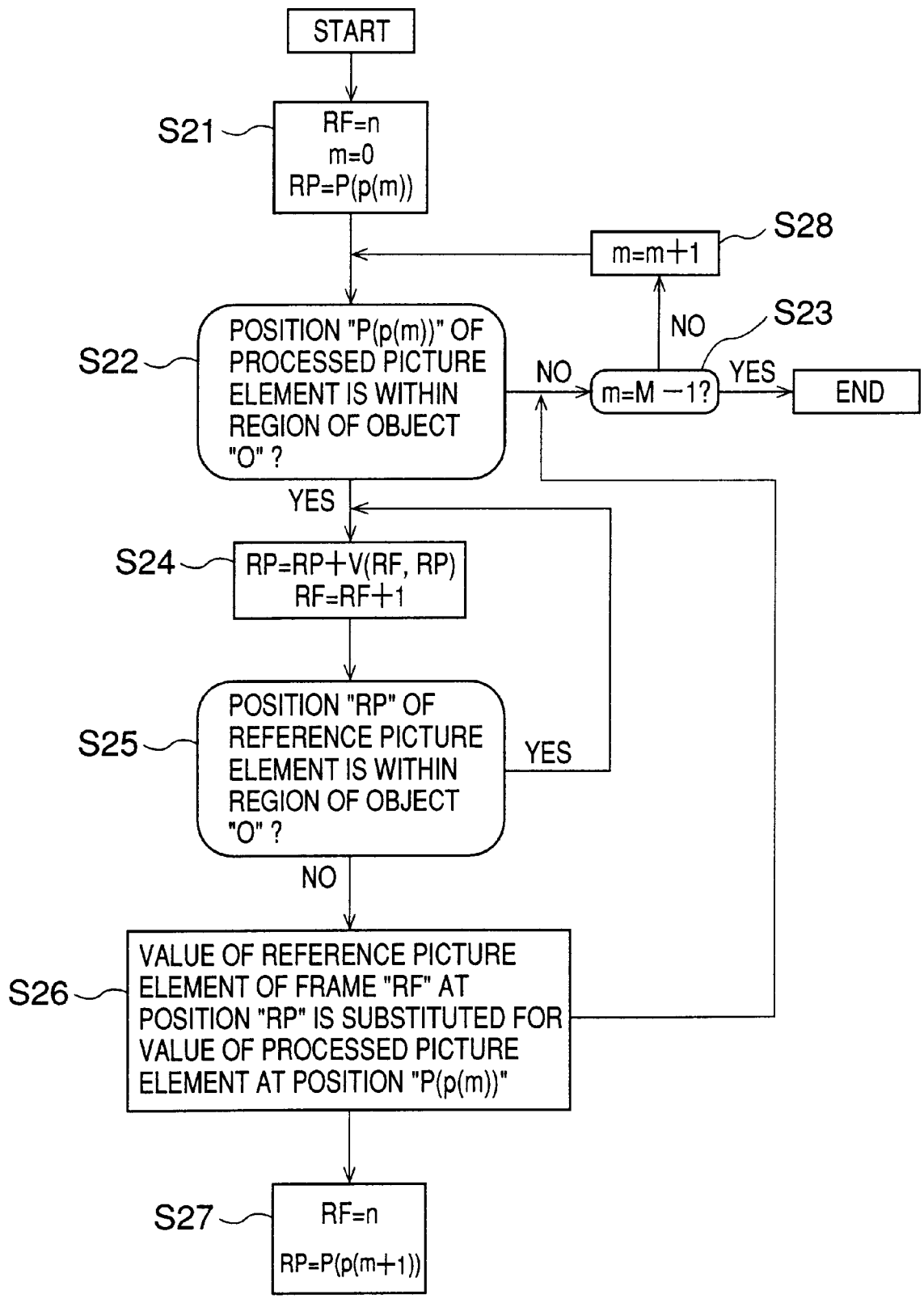
FIG. 5 is a flowchart for explaining a procedure of determining estimated values of the concealed picture elements, which is performed in one embodiment of the present invention.

FIG. 5 shows a procedure of determining estimated values of the concealed picture elements, which is performed by the picture element estimating unit 12 in one embodiment of the present invention.

The procedure, shown in FIG. 5, is called a following-frame reference method. In the following-frame reference method, an estimated value of a picture element P (which is one of the concealed picture elements) of a processed frame F(T) at a time T is determined by a value of a corresponding picture element P' of a following processed frame F(T+1) at a time (T+1) when a movement of the picture element P of the F(T) to a position of the picture element P' of the F(T+1) is generated by a displacement indicated by the estimated motion vector of the picture element P of the F(T), and the position of the picture element P' as a result of the repetition of such movement is detected to be outside the region of the overlay object in the motion picture.

As described above, in the following-frame reference method, the position of the picture element P' of the F(T+1) is generated by a sum of the position L(P) of the picture element P of the F(T) and the estimated motion vector of the picture element P. When it is detected that the position of the picture element P' of the F(T+1) is outside the region of the overlay object, the value of the picture element P' at that time is determined as the estimated value of the picture element P of the F(T).

In the flowchart shown in FIG. 5:

"n" indicates a sequence number of a processed frame;

"RF" indicates a sequence number of a reference frame;

"RP" indicates a position of a reference picture element;

"m" indicates an identification (ID) number of a processed picture element;

"M" indicates the total number of picture elements included in the processed frame;

"p(m)" indicates the picture element with the ID number m;

"P(p(m))" indicates a position of the processed picture element of the ID number m;

"O" indicates the overlay object (to be removed) of the processed frame; and

"V(RF, RP)" indicates the estimated motion vector of the reference picture element of the reference frame RF at the position RP.

Referring to FIG. 5, when the procedure of the following-frame reference method is started, step S21 initializes the variables which are used in the procedure. The sequence number "RF" of the reference frame is set so that it is the same as the sequence number "n" of the processed frame (RF=n). The ID number "m" of the processed picture element is set at zero (m=0). The position "RP" of the reference picture element is set so that it is the same as the position "P(p(m))" of the processed picture element with the ID number "m" (RP=P(p(m))).

Step S22 detects whether the position "P(p(m))" of the processed picture element is within a region of the overlay object "O" of the processed frame indicated by "n" in the motion picture.

If the result at the step S22 is negative, it is determined that the position "P(p(m))" of the processed picture element is outside the region of the overlay object "O". Step S23 detects whether the processed picture element indicated by "m" is the same as the final picture element indicated by "(M−1)". If it is detected at the step S23 that the processed picture element "m" is the final picture element "(M−1)", the procedure of FIG. 5 ends. If it is detected at the step S23 that the processed picture element "m" is not the final picture element "(M−1)", step S28 is performed and the procedure is returned to the above step S22. Step S28 increments the ID number "m" of the processed picture element (m=m+1). After the step S28 is performed, a determination for the following processed picture element "m" is performed at the step S22.

If the result at the step S22 is affirmative, it is determined that the position "P(p(m))" of the processed picture element is within the region of the overlay object "O". Step S24 is performed for the estimation of the value of the picture element. At the step S24, a sum of the position "RP" of the reference picture element and the estimated motion vector "V(RF, RP)" of the reference picture element of the reference frame "RF" at the position "RP" is generated as a new position of the reference picture element (RP=RP+V(RF, RP)), and the sequence number "RF" of the reference frame is incremented (RF=RF+1).

After the step S24 is performed, step S25 detects whether the new-position "RP" of the reference picture element, generated at the step S24, is within the region of the overlay object "O" of the new reference frame "RF".

If the result at the step S25 is affirmative, it is determined that the new position "RP" of the reference picture element is still within the region of the overlay object "O". The procedure is returned to the above step S24.

If the result at the step S25 is negative, it is determined that the new position "RP" of the reference picture element is outside the region of the overlay object "O". Step S26 is performed.

At the step S26, a value of the reference picture element of the reference frame "RF" at the position "RP" at that time is substituted for the value of the processed picture element of the processed frame "n" at the position "P(p(m))".

After the step S26 is performed, step S27 is performed to initialize the variables. The step S27 is similar to the above step S21. At the step S27, the sequence number "RF" of the reference frame is set so that it is the same as the sequence number "n" of the processed frame (RF=n). The position "RP" of the reference picture element is set so that it is the same as the position "P(p(m+1))" of the processed picture element of the ID number "m+1" (RP=P(p(m+1))).

After the step S27 is performed, the procedure is transferred to the above step S23. At the step S23, it is detected whether the processed picture element indicated by "m" is the final picture element indicated by "(M−1)". If it is detected that the processed picture element "m" is the final picture element "(M−1)", the procedure of FIG. 5 ends. If it is detected that the processed picture element "m" is not the final picture element "(M−1)", the above step S28 is performed and the procedure is returned to the above step S22. The step S28 increments the ID number "m" of the processed picture element (m=m+1). After the step S28 is performed, a determination for the following processed picture element "m" is performed at the step S22.

Figure 6:
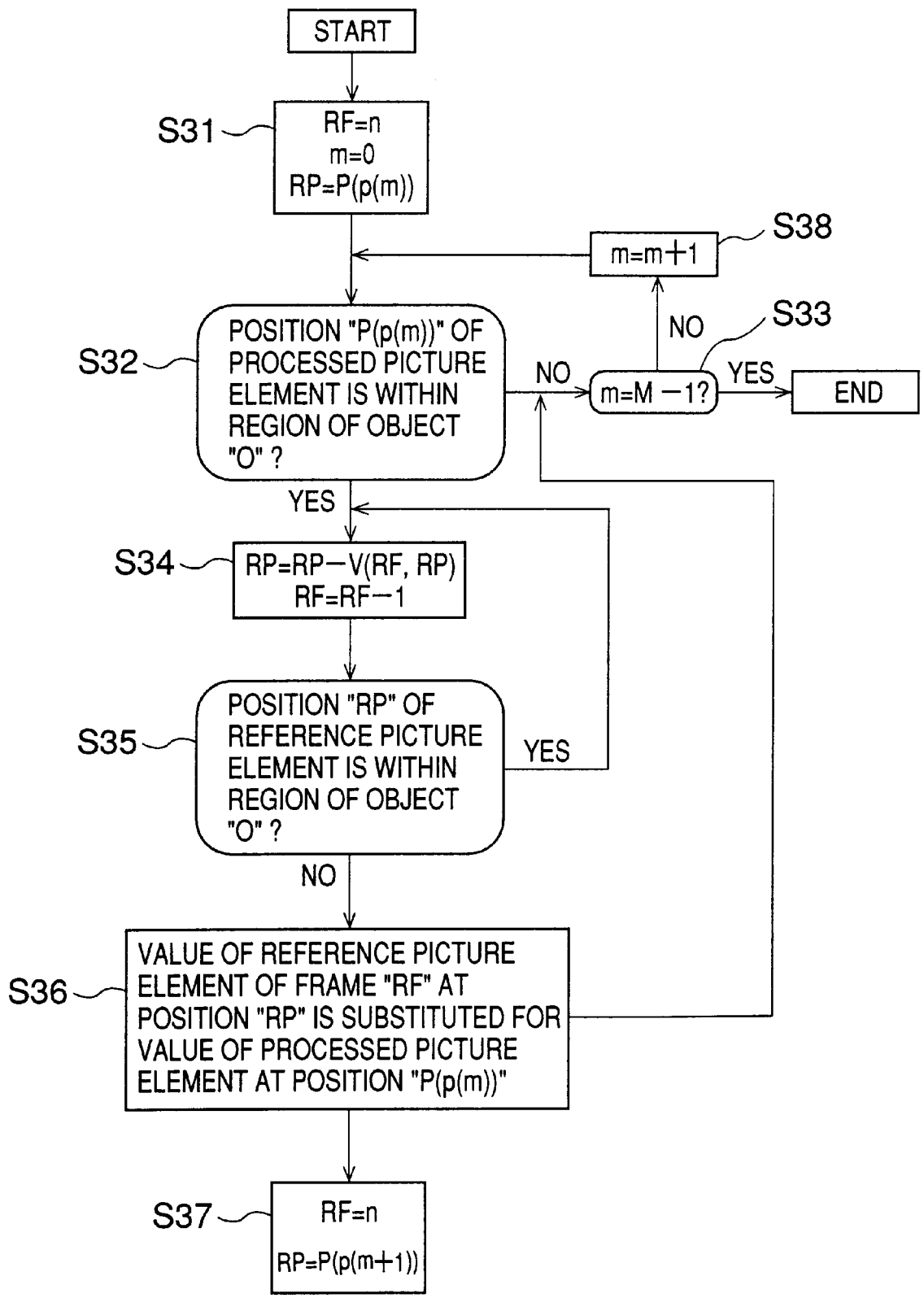
FIG. 6 is a flowchart for explaining another procedure of determining estimated values of the concealed picture elements, which is performed in another embodiment of the present invention.

FIG. 6 shows another procedure of determining estimated values of the concealed picture elements, which is performed by the picture element estimating unit 12 in another embodiment of the present invention.

The procedure, shown in FIG. 6, is called a preceding-frame reference method. In the preceding-frame reference method, an estimated value of a picture element P (which is one of the concealed picture elements) of a processed frame F(T) at a time T is determined by a value of a corresponding picture element P' of a preceding processed frame F(T−1) at a preceding time (T−1) when a backward movement of the picture element P of the F(T) to a position of the picture element P' of the F(T−1) is generated by a displacement indicated by the inversion of the estimated motion vector of the picture element P of the F(T), and the position of the picture element P' as a result of the repetition of such movement is detected to be outside the region of the overlay object within the original picture.

As described above, in the preceding-frame reference method, the position of the picture element P' of the F(T−1) is determined by a sum of the position L(P) of the picture element P of the F(T) and the inversion of the estimated motion vector of the picture element P. When it is detected that the position of the picture element P' of the F(T−1) as a result of the repetition of the backward movement is outside the region of the overlay object, the value of the picture element P' at that time is determined as the estimated value of the picture element P of the F(T).

The procedure of the preceding-frame reference method in FIG. 6 is similar to the procedure in FIG. 5. Steps S31 through S38 of the flowchart in FIG. 6 are essentially the same as the steps S21 through S28 of the flowchart in FIG. 5. Only the manner at the step S34 to move the picture element by a displacement indicated by the motion vector is different from the manner at the step S24.

The preceding-frame reference method in FIG. 6 uses the backward movement of the concealed picture elements related to the preceding frames, and the following-frame reference method in FIG. 5 uses the forward movement of the concealed picture elements related to the following frames.

At the step S34 of the procedure in FIG. 6, a sum of the position "RP" of the reference picture element and the inversion of the estimated motion vector "V(RF, RP)" of the reference picture element of the reference frame "RF" at the position "RP" is generated as a new position of the reference picture element [RP=RP−V(RF, RP)], and the sequence number RF of the reference frame "RF" is decremented [RF=RF−1].

Figure 7A:
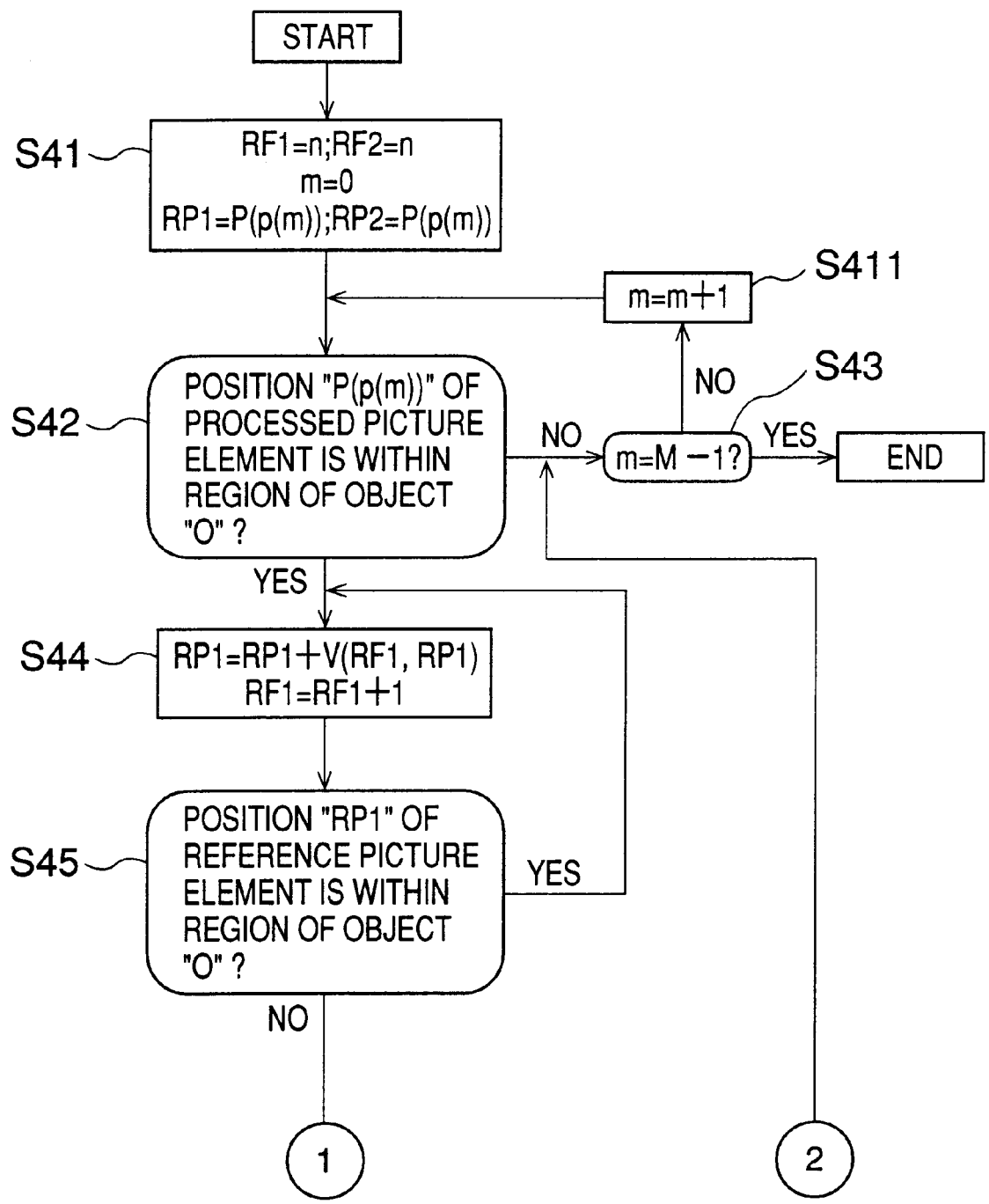
FIGS. 7A and 7B are a flowchart for explaining a further procedure of determining estimated values of the concealed picture elements, which is performed in a further embodiment of the present invention.
Figure 7B:
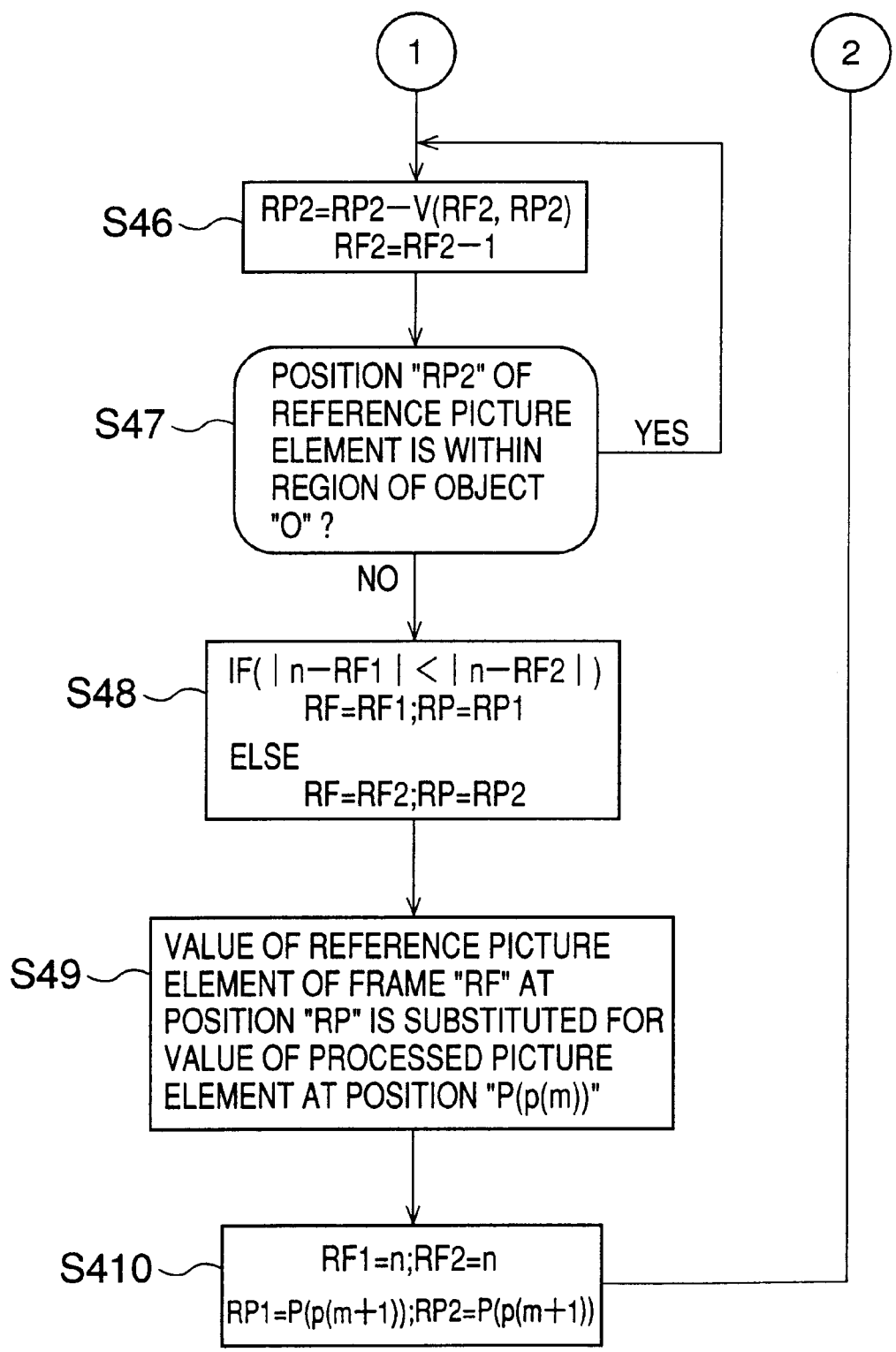

FIGS. 7A and 7B show a further procedure of determining estimated values of the concealed picture elements, which is performed by the picture element estimating unit 12 in a further embodiment of the present invention.

The procedure, shown in FIGS. 7A and 7B, is based on a combination of the following-frame reference method in FIG. 5 and the preceding-frame reference method in FIG. 6. In the combined reference method in FIGS. 7A and 7B, an estimated value of a picture element P (which is one of the concealed picture elements) of a processed frame F(T) at a time T is determined by a selected one of the value of the picture element P' according to the following-frame reference method and the value of the picture element P' according to the preceding-frame reference method.

In the combined reference method in FIGS. 7A and 7B, one of the picture element value determined by the following-frame reference method and the picture element value determined by the preceding-frame reference method is selected as the estimated value of the processed picture element P. In the combined reference method, the absolute values of time differences between the reference frame and the processed frame when the estimated picture element value is determined according to the two methods respectively are compared with each other. The estimated value of the picture element is determined by selecting one of the picture element values according to the two methods, the selected one of the picture element values being related to one method the absolute value of the time difference of which is smaller than the absolute value of the time difference of the other method.

The procedure of the combined reference method in FIGS. 7A and 7B is similar to the procedures in FIGS. 5 and 6. Steps S41 through S411 of the flowchart in FIGS. 7A and 7B are essentially the same as the steps S21 through S28 of the flowchart in FIG. 5 and the steps S31 through S38 of the flowchart in FIG. 6.

Referring to FIG. 7A, steps S44 and S45 (corresponding to the steps S24 and S25 in FIG. 5) perform the estimation of the picture element value according to the following-frame reference method. The sequence number of the reference frame related to the following-frame reference method is indicated by "RF1", and the position of the reference picture element is indicated by "RP1".

Referring to FIG. 7B, steps S46 and S47 (corresponding to the steps S34 and S35 in FIG. 6) perform the estimation of the picture element value according to the preceding-frame reference method. The sequence number of the reference frame related to the preceding-frame reference method is indicated by "RF2", and the position of the reference picture element is indicated by "RP2".

At step S48, the absolute value |n−RF1| of a time difference between the reference frame "RF1" and the processed frame "n" when the estimated picture element value is determined according to the following-frame reference method and the absolute value |n−RF2| of a time difference between the reference frame "RF2" and the processed frame "n" when the estimated picture element is determined according to the preceding-frame reference method are compared with each other. The estimated value of the picture element is determined by selecting one of the picture element values according to the two methods, the selected one of the picture element values being related to one method the absolute value of the time difference of which is smaller than the absolute value of the time difference of the other method.

If the |n−RF1| is smaller than the |n−RF2|, the sequence number "RF" of the final reference frame is set at the "RF1", and the position "RP" of the final reference picture element is set at the "RP1". Otherwise, the sequence number "RF" of the final reference frame is set at the "RF2", and the position "RP" of the final reference picture element is set at the "RP2".

After the step S48 is performed, step S49 substitutes a value of the final reference picture element of the reference frame "RF" at the position "RP" for the value of the processed picture element of the processed frame "n" at the position "P(p(m))".

After the step S49 is performed, step S410 is performed to initialize the variables. At the step S410, the sequence number "RF1" and the sequence number "RF2" are set so that they are the same as the sequence number "n" of the processed frame [RF1=n, RF2=n]. The position "RP1" and the position "RP2" are set so that they are the same as the position "P(p(m+1))" of the processed picture element of the ID number "m+1" [RP1=P(p(m+1)), RP2=P(p(m+1))].

The above procedure of the combined reference method of FIGS. 7A and 7B is repeated until the processed picture element "m" becomes the final picture element "M−1", similarly to the previous procedures of FIGS. 5 and 6.

Further, the present invention is not limited to the above-described embodiments, and variations and modifications may be made without departing from the scope of the present invention.

What is claimed is:

1. A motion picture reconstructing method, comprising:

inputting motion picture data of a plurality of frames including a processed frame and a reference frame;

inputting motion vectors of picture elements of each frame, region data of objects in each frame, and object identification data, said object identification data indicating an object among the objects to be removed;

determining estimated values of picture elements of the processed frame by using estimated motion vectors of picture elements of the reference frame, said picture elements of the processed frame being within a region of said object and concealed by said object;

substituting said estimated values for values of said concealed picture elements of the processed frame; and outputting said picture elements having said estimated values, which constitute a reconstructed motion picture in which said object is removed.

2. The method according to claim 1, wherein said method further comprises:

determining estimated motion vectors of the concealed picture elements of the processed frame by motion vectors of corresponding picture elements of the reference frame, said motion vectors of the corresponding picture elements being read from said input motion vectors of the reference frame.

3. The method according to claim 2, wherein said determining step of the estimated motion vectors includes:

determining an estimated motion vector of each concealed picture element based on motion vectors of non-concealed picture elements in the vicinity of said object, said motion vectors of the non-concealed picture elements being read from said input motion vectors of the reference frame.

4. The method according to claim 2, wherein said determining step of the estimated motion vectors includes:

determining an estimated motion vector of each concealed picture element based on a motion vector of a non-concealed picture element on a boundary of said object, said non-concealed picture element being nearest to the concealed picture element, and said motion vector of said non-concealed picture element being read from said input motion vectors of the reference frame.

5. The method according to claim 4, wherein said estimated motion vector of the concealed picture element is determined by a distance-weighted average of motion vectors of a number of non-concealed picture elements including said nearest non-concealed picture element, said distance-weighted average determined depending on distances of the non-concealed picture elements from the concealed picture element.

6. The method according to claim 3, wherein the estimated motion vectors of all the concealed picture elements are determined by a typical value of motion vectors of a number of non-concealed picture elements in the vicinity of said object.

7. The method according to claim 6, wherein said motion vectors of said non-concealed picture elements include at least a motion vector of a non-concealed picture element on a boundary of said object, said non-concealed picture element being nearest to the concealed picture element.

8. The method according to claim 2, wherein said determining step of the estimated picture element values includes:

generating a position of a corresponding picture element P' of a following processed frame F(T+1) at a time (T+1) through movement of a picture element P of a processed frame F(T) at a time T using a displacement indicated by an estimated motion vector of the picture element P of the F(T); and determining an estimated value of the picture element P of the F(T) by a value of the corresponding picture element P' at the generated position when the generated position of the corresponding picture element P' as a result of the repetition of said movement is detected to be outside the region of said object in the motion picture.

9. The method according to claim 8, wherein the position of the corresponding picture element P' of the F(T+1) is generated by a sum of a position L(P) of the picture element P of the F(T) and the displacement indicated by the estimated motion vector of the picture element P, said generating of the position of the corresponding picture element P' is repeated with respect to the motion picture data of a further following processed frame, and, when it is detected that the position of the corresponding picture element P' as a result of the repetition of said generating is outside the region of said object, the value of the corresponding picture element P' is determined as the estimated value of the picture element P of the F(T).

10. The method according to claim 2, wherein said determining step of the estimated picture element values includes:

generating a position of a corresponding picture element P' of a preceding processed frame F(T-1) at a time (T-1) through backward movement of a picture element P of a processed frame F(T) at a time T using a displacement indicated by inversion of an estimated motion vector of the picture element P of the F(T); and determining an estimated value of the picture element P of the F(T) by a value of the corresponding picture element P' at the generated position when the generated position of the corresponding picture element P' as a result of the repetition of said movement is detected to be outside the region of said object in the motion picture.

11. The method according to claim 10, wherein the position of the picture element P' of the F(T-1) is generated by a sum of a position L(P) of the picture element P of the F(T) and the inversion of the estimated motion vector of the picture element P, said generating of the position of the corresponding picture element P' is repeated with respect to the motion picture data of a further preceding processed frame, and, when it is detected that the position of the corresponding picture element P' as a result of the repetition of said generating is outside the region of said object, the value of the corresponding picture element P' is determined as the estimated value of the picture element P of the F(T).

12. The method according to claim 10, wherein said determining step of the estimated picture element values includes:

storing said determined estimated value of the picture element P of the F(T) in a memory, said stored value being used to determine an estimated value of a corresponding picture element of a following processed frame F(T+1) at a time (T+1).

13. The method according to claim 2, wherein said determining step of the estimated picture element values includes:

generating a position of a corresponding picture element P1 of a following processed frame F(T+1) at a time (T+1) through movement of a picture element P of a processed frame F(T) at a time T using a displacement indicated by an estimated motion vector of the picture element P of the F(T);

detecting that the generated position of the corresponding picture element P1 as a result of the repetition of said movement is outside the region of said object;

determining an estimated value of the picture element P of the F(T) by a first value of the corresponding picture element P1 of a first reference frame RF1 at the generated position;

generating a position of a corresponding picture element P2 of a preceding processed frame F(T-1) at a time (T-1) through backward movement of the picture element P of the F(T) using a displacement indicated by inversion of the estimated motion vector of the picture element P of the F(T);

detecting that the generated position of the corresponding picture element P2 as a result of the repetition of said backward movement is outside the region of said object;

determining the estimated value of the picture element P of the F(T) by a second value of the corresponding picture element P2 of a second reference frame RF2 at the generated position; and selecting one of said first value and said second value as the estimated value of the picture element P of the F(T) depending on which of a time difference between the first reference frame RF1 and the processed frame and a time difference between the second reference frame RF2 and the processed frame is smaller.

14. A motion picture reconstructing apparatus comprising:

a first estimating unit inputting motion vectors of picture elements of a plurality of frames, region data of objects in a motion picture of each frame, and object identification data, said frames including a processed frame and a reference frame, said object identification data indicating an object among the objects to be removed; and a second estimating unit, coupled to said first estimating unit, inputting motion picture data of each frame, said region data of each frame and said object identification data, wherein said first estimating unit determines estimated motion vectors of picture elements of the processed frame by motion vectors of corresponding picture elements of the reference frame, in accordance with said input motion vectors of the reference frame, said picture elements of the processed frame being within a region of said object and concealed by said object, said second estimating unit determining estimated values of picture elements of the processed frame by using said estimated motion vectors from said first estimating unit, said second estimating unit substituting said estimated values for values of said concealed picture elements of the processed frame, and outputting said picture elements having said estimated values, which constitute a reconstructed motion picture in which said object is removed.

15. A motion picture reconstructing method comprising:
inputting motion picture data of a plurality of frames including a processed frame and a reference frame; and
determining estimated values of picture elements of the processed frame by using estimated motion vectors of picture elements of the reference frame when said picture elements of the processed frame are within a region of an object and concealed by said object.

\* \* \* \* \*